June 7, 1932.  W. E. HOKE  1,862,146
SCREW THREAD GAUGE
Filed Aug. 15, 1929  2 Sheets-Sheet 1
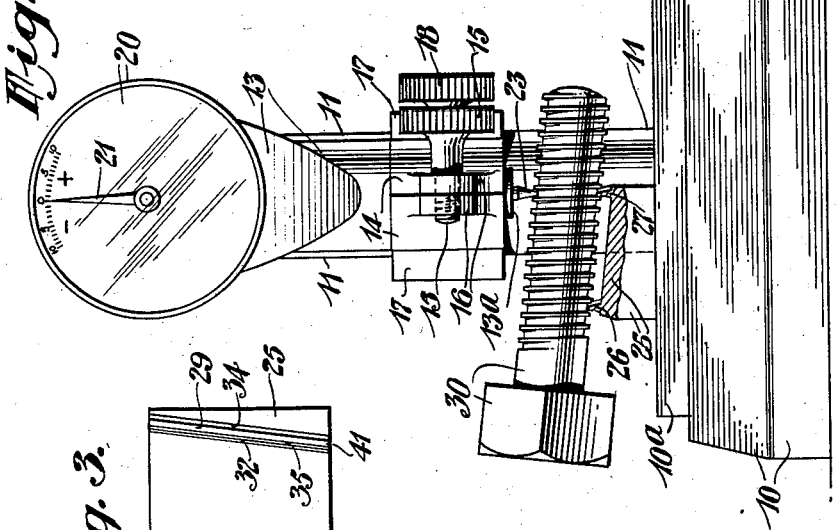
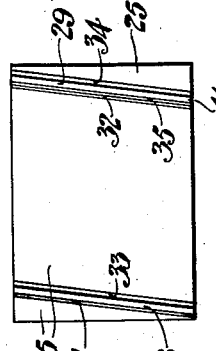
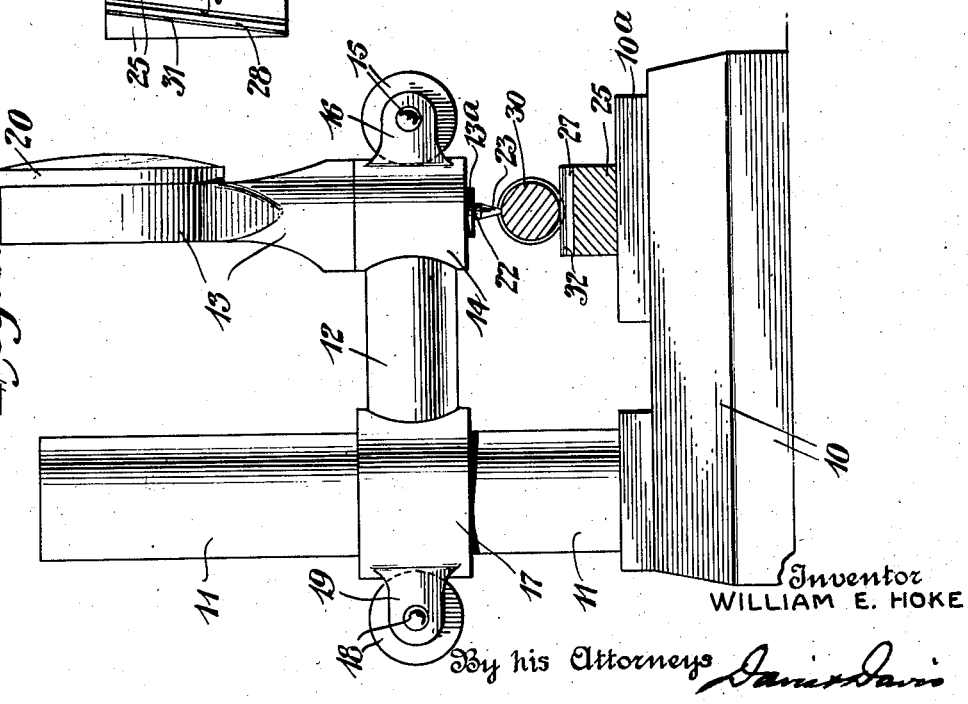
Inventor
WILLIAM E. HOKE
By his Attorneys June 7, 1932.  W. E. HOKE  1,862,146
SCREW THREAD GAUGE
Filed Aug. 15, 1929  2 Sheets-Sheet 2
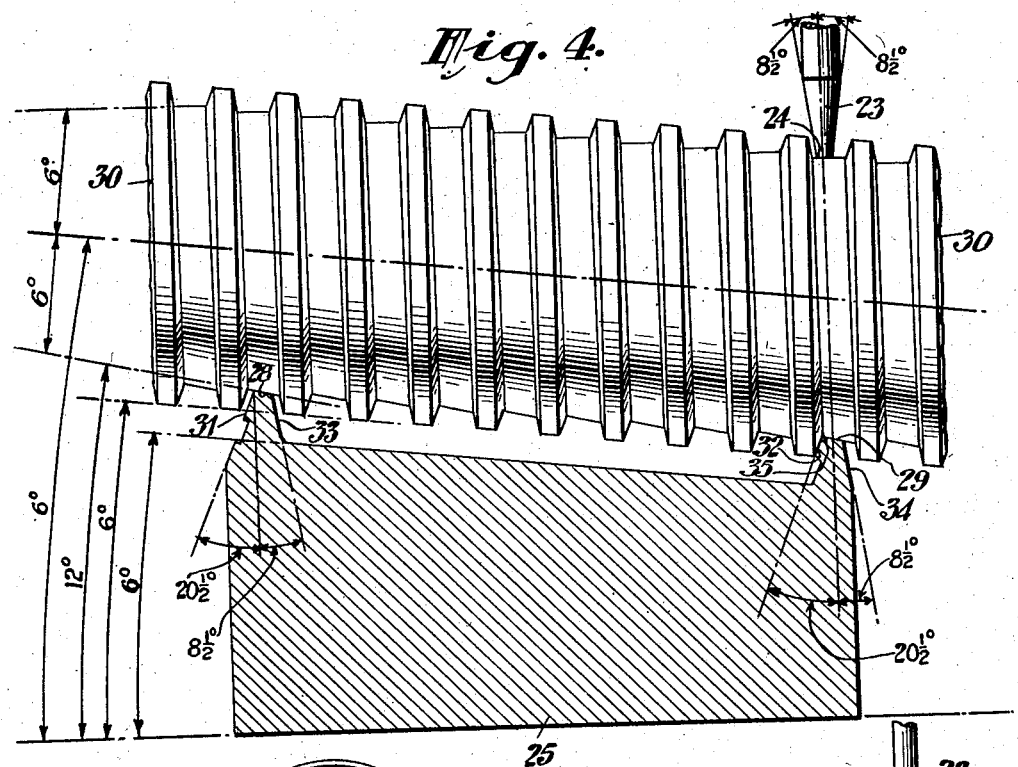
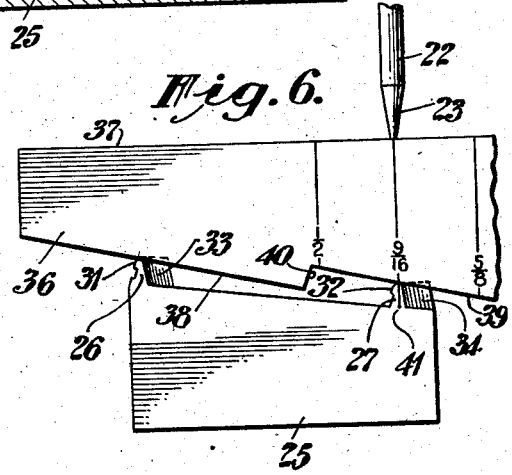
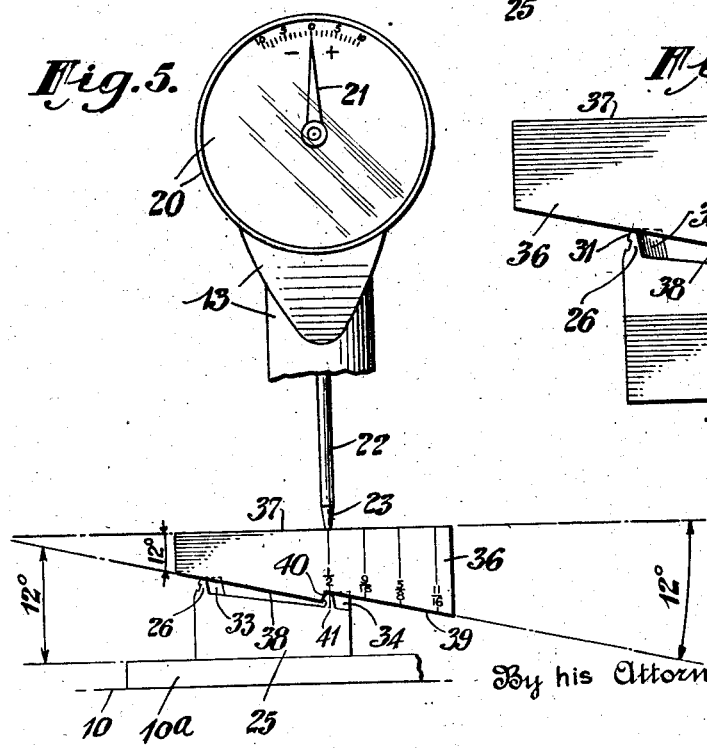
Inventor
WILLIAM E. HOKE
By his Attorneys Patented June 7, 1932

1,862,146

UNITED STATES PATENT OFFICE

WILLIAM E. HOKE, OF BALTIMORE, MARYLAND, ASSIGNOR TO DARDELET THREAD-LOCK CORPORATION, OF NEW YORK, N. Y., A CORPORATION OF DELAWARE

SCREW THREAD GAUGE

Application filed August 15, 1929. Serial No. 386,079.

This invention relates to improvements in screw thread gauges and has for its principal objects to provide simple and efficient means for gauging screw threads having oblique helicoidal root surfaces, to provide a gauge of the comparator type for gauging the minor diameter, or minimum root diameter of standard Dardelet external screw threads; to provide an efficient adjustable comparator means for gauging Dardelet screw threads capable of use for comparing all sizes of threads or a large range of sizes of threads; and to provide a variation indicating adjustable comparator for various standard sizes of Dardelet threads and simple master setting means for setting the comparator for use in connection with threads of various sizes.

Other objects and advantages of the invention will appear from the following description of the preferred embodiment of the invention illustrated in the accompanying drawings.

In the drawings:

Fig. 1 is a side elevation of the gauge with a standard Dardelet bolt therein, the bolt support being shown in vertical section;

Fig. 2 a front elevation, the upper part of the bolt support being shown in section;

Fig. 3 a top plan view of the shiftable bolt support;

Fig. 4 a detail view on an enlarged scale, showing the bolt and parts of the gauge positioned as in Figs. 1 and 2; and Figs. 5 and 6 detail views showing the master setting block positioned for setting the gauge for comparison of threads with the standard 1/2 inch and 9/16 inch sizes of Dardelet bolts, respectively.

The gauge is a portable comparator of the dial indicator type and has a flat bottomed base member 10 of substantially square shape in plan view. A vertical post or standard 11 of cylindrical cross section rises from the base, being rigidly secured at its lower end to the base adjacent the rear edge and approximately midway between the ends of the base, as shown. A vertically adjustable and horizontally disposed arm or bracket 12 extends forwardly from post 11 to adjustably support the dial indicator 13. Arm 12 has a split clamping sleeve 14 formed on its forward end embracing the reduced bottom portion 13ᵃ of the casing of the dial indicator, a clamping screw 15 extending through ears 16 on sleeve 14. The arm 12 has a similar split sleeve 17 formed on its rear end and embracing the post 11, a clamping screw 18 extending through the ears 19 of said sleeve, similar to ears 16 of sleeve 14, to tightly clamp the arm to the post in different vertically adjusted positions.

The dial indicator 13 has the usual rotatably adjustable dial portion 20 preferably graduated on the dial face, as shown, to indicate in 1/1000ths of an inch plus and minus variations from a standard for which the gauge is set. The indicator has the usual rotatable indicator hand or pointer 21 actuated by the usual vertically movable spring pressed plunger 22 of the indicator.

Plunger 22 in the present construction has its lower end portion 23 tapered to form a frusto-conical thread groove entering portion of substantial length but of small area on its bottom root surface contact face 24. All tangent planes to the periphery of conical portion 23 are inclined at an angle of 8½° to the axial line of the endwise reciprocable plunger 22, and the bottom contact face 24 of the plunger is a plane face perpendicular to said axial line.

The base 10 is formed with a raised portion 10ᵃ of oblong form in plan in front of post 11 and extending under the plunger 22 of the dial indicator, said raised portion having a plane top face lying in a horizontal plane, i. e., a plane perpendicular to the axis of the plunger 22. Portion 10ᵃ is made sufficiently long and sufficiently wide fore and aft of the base to slidably support an anvil or bolt support 25 for fore and aft movement into and out of position below the plunger 22 and for substantial sidewise movement of the support, all in a plane perpendicular to the axial line and direction of reciprocation of the plunger.

The work support or anvil 25 comprises a steel block, and has a plane or flat bottom face for slidably seating on the plane top face of portion 10ᵃ of the base, and a plane top face making an angle of six degrees with its bottom face, said top face of the anvil sloping from one end edge of the oblong anvil block to the other. A pair of ribs 26 and 27 rise from the top face of block or anvil 25, said ribs preferably extending diagonally across said anvil, as shown, at a slight angle to the ends of the anvil so that a bolt or other externally threaded part seated on the tops of the ribs may extend directly lengthwise of the anvil.

The standard Dardelet external screw thread has a root surface making an angle of six degrees with the axial line of the thread, and the side walls of the thread groove each slope at an angle of fourteen and one-half degrees to a perpendicular to the axial line of the thread. A standard Dardelet bolt 30 is shown in Figs. 1, 3 and 4, the particular bolt shown having nine threads to the inch.

The ribs have top plane faces 28 and 29 for contacting the oblique helicoidal root surfaces of Dardelet threads, said plane faces each being inclined at an angle of twelve degrees to the bottom face of the anvil and arranged to support the bolt at two lengthwise spaced points on the bolt with the axial line of the bolt and thread at an angle of six degrees to the horizontal. Faces 28 and 29 are made narrow so that they may seat on the root surface of threads of all, or a large range of, sizes of bolts, and the side faces of the ribs are inclined to the perpendicular at angles to permit such seating. Side face 31 of rib 26 and side face 32 of rib 27 face toward the higher end of the anvil and make an angle of 20½° with the perpendicular, while side face 33 of rib 26 and side face 34 of rib 27 face toward the lower end of the anvil and make an angle of 8½° with the perpendicular.

The ribs may be so spaced that side faces 31 and 32 lie in planes precisely one inch apart, if desired, so that both said faces will abut that side wall of the thread groove which extends along the deepest part of the groove, irrespective of the size of thread, but preferably said distance is made a few thousandths of an inch less than one inch so that only the face 32 will contact said wall of the thread groove, as shown. The anvil block may thus still be used to support different bolts or parts having all or a large number of sizes of threads, while facilitating fitting of the threaded part upon the anvil and allowing the threaded part to gravitate endwise to insure seating of rib 27 in the deepest part of the thread groove. If desired, for greater precision in gauging, rib 27 may be slightly chamfered, as shown at 35, to insure face 32 abutting the side wall of the thread groove and face 29 seating on the root surface of the thread in the event of there being a burr or rounding in the low corner of the groove. The distance between the planes of faces 33 and 34 of the two ribs is also preferably slightly less than one inch, as shown.

A master gauge setting block 36 of novel construction is shown in Figs. 5 and 6 for setting the gauge to read "0" when bolts with threads of a standard minor diameter are gauged, said master being adapted for use in setting the gauge for different standard minor diameters of threads. The master block is formed of suitable metal, such as steel, and has a flat or plane top face 37, while its bottom surface is divided transversely of the block into two flat or plane faces 38 and 39 lying in parallel inclined planes making an angle of twelve degrees with the plane top face 37, the faces 38 and 39 being joined by a short intermediate plane face 40 preferably making an angle of twenty and one-half degrees with a perpendicular to top face 37.

One side face of the setting block is provided with graduations, preferably stamped or etched therein, extending to the adjacent edge of face 39 and preferably also to face 37 along lines perpendicular to face 37, as shown, and with associated indices of the corresponding sizes of bolts or major thread diameters. Each such measurement through the block perpendicular to face 37 conforms with a core measurement for a different size of bolt taken in a line at an angle of six degrees with a perpendicular to the bolt axis between two points on the deepest edge of the thread groove located 180 degrees apart.

The lower edges of the top faces of the anvil ribs 26 and 27 touch a plane making an angle of six degrees with the flat base of the anvil 25, and the planes of faces 38 and 39 are so spaced that when said faces 38 and 39 are seated on the top faces of ribs 26 and 27, respectively, the top face of the master block will lie in a plane parallel with the bottom face of the anvil.

To set the gauge for testing threads for one-half inch bolts, for example, the master is applied to the anvil or bolt support, as shown in Fig. 5, and the anvil with the master thereon is slid on the flat top of raised portion 10ª of the gauge base until rib 27 is positioned below the dial indicator plunger 22, which plunger is seated on face 37 of the master with the plunger raised to a point intermediate its upper and lower limits of movement, the dial indicator being raised or lowered by means of the adjustable supporting bracket 12, if necessary for obtaining such a positioning of the plunger. The adjustable dial of the indicator is then rotated, if necessary, until hand 21 points to "0" on the dial. The anvil and master are then slid out from under the plunger and the gauge is ready for comparing or gauging the threads of bolts or other externally threaded members to determine whether said threads have the standard minor diameter and to indicate in 1/1000ths of an inch the extent of over or under size, if such there be. In Fig. 6 the master is shown shifted endwise for setting the gauge for a 9/16 inch bolt. Preferably, rib 27 on the anvil is formed with a vertical graduation groove 41, as shown, at one end of the rib for coaction with the graduations on the master block to facilitate accurate setting of the gauge. It will be understood that additional masters varying in size may be provided for sizes of threads other than those indicated on the master shown.

The gauge having been set for gauging a one-half inch bolt thread, the Dardelet bolt 30 is placed on the anvil, as shown in Figs. 1 and 2, with the deeper edge of the thread groove toward the higher end of the anvil and ribs 26 and 27 extending into the thread groove. The bolt will slide or may be forced endwise until face 32 of rib 27 abuts that side wall of the thread groove which extends along the deeper edge of the groove. The root surface in two turns of the groove located one inch apart will seat on rib faces 28 and 29 from edge to edge of said faces at the under side of the bolt, the axial line of the bolt will make an angle of six degrees with the horizontal, and the root surface at the top of the bolt between each turn of the rib will lie transversely of the groove in a horizontal plane parallel with the bottom contact face 24 of the dial indicator plunger. The anvil or bolt support with the bolt thus positioned is then slid under the plunger to position rib 27 under the plunger which may be lifted by hand and lowered into the thread groove to seat on the root surface at a point opposed to the point of contact of rib face 29 with the root surface. If the thread has the proper minor diameter, the hand 21 will point to "0" on the dial, but if it has a lesser or a greater minor diameter, the hand will swing to the left or right one point on the dial for each one-thousandth of under or over size, respectively.

By the peculiar arrangement of three-point contact, threads of various sizes having an oblique helicoidal root surface, and particularly standard Dardelet external threads, may be accurately and quickly gauged as to minor diameter. It will be observed that the accuracy of the gauging is not dependent upon the end of the movable plunger contacting any particular widthwise portion of the thread groove, since the gauging is done in a transverse plane through the bolt at an angle to the perpendicular to the bolt axis equal to the angle of slope of the root surface to the bolt axis, the bolt being supported with its axis at a similar angle to the horizontal. The cocked supporting of the bolt also facilitates or ensures seating of one of the two opposed gauging root conducting elements in the deepest part of the groove.

What I claim is:

1. In a gauge for screw threads with an oblique helicoidal root surface, the combination of a base having a flat top surface portion, means mounted on the base for supporting a dial indicator, a dial indicator carried by said supporting means having an actuating member with a single thread groove entering portion having a single thread root contacting end located above and movable up and down relatively to said flat horizontally disposed top surface portion of the base, and a support for a threaded member to be gauged freely slidable on said flat top surface and provided with parallel spaced upstanding thread groove entering ribs engageable in two different turns of the thread groove of the threaded member at the under side of the threaded member and extending to different levels above the flat top surface portion of the base to support the threaded member with the axial line of its thread inclined to the horizontal at an angle equal to the angle of slope of the oblique helicoidal root surface to the axial line of the thread.

2. A bolt support for use in dial indicator comparators for Dardelet bolt threads, comprising a block having a flat bottom and a pair of parallel ribs on the top of said block, said ribs having plane top surfaces for engaging the thread root surface inclined transversely thereof at an angle of 12 degrees to the plane of the bottom of the block and differentially spaced from said block bottom to sustain a Dardelet bolt with its axis at an angle of 12 degrees to the plane of the block bottom, said ribs being spaced apart approximately one inch.

3. A bolt support for use in dial indicator comparators for Dardelet bolt threads, comprising a block having a flat bottom and a pair of parallel ribs on the top of said block, said ribs having plane top surfaces for engaging the thread root surface inclined transversely thereof at an angle of 12 degrees to the plane of the bottom of the block and differentially spaced from said block bottom to sustain a Dardelet bolt with its axis at an angle of 12 degrees to the plane of the block bottom, said ribs being spaced apart approximately one inch, and each having a side face at its higher side making an angle of 20½ degrees with the perpendicular to the block bottom and an opposite side face making an angle of 8½ degrees with said perpendicular.

4. A gauge for Dardelet bolts and other members provided with external Dardelet threads, comprising supporting means for engaging the thread root surface at one side of the threaded member at two points spaced approximately one inch apart, and an opposed movable means for engaging the thread root surface at the opposite side of the member and movable transversely of a threaded member engaged by said first-mentioned means, said first-mentioned means having two root surface engaging plane faces lying in parallel planes which make an angle of twelve degrees with a perpendicular to the path of movement of said opposed movable means and are so spaced apart as to support the threaded member for measuring the root diameter along a path making an angle of six degrees with a perpendicular to the axial line of the thread.

5. A minor diameter gauge for external Dardelet screw threads, comprising a dial indicator having a movable actuating element provided with an end portion for engaging in the groove of a thread to be gauged, an anvil having a pair of parallel thread groove entering ribs each having a plane top face, said faces being arranged in parallel planes for simultaneously contacting the root surface of a Dardelet thread throughout their width, and means supporting the dial indicator and anvil with said rib top faces in planes making an angle of twelve degrees with a perpendicular to the path of movement of the actuating element of the indicator.

6. A minor diameter gauge for external Dardelet screw threads, comprising a support, a member movable horizontally on said support and having a pair of parallel thread groove entering elements for supporting a threaded member for gauging, each of said elements having a plane top face and two plane side faces converging toward said top face, the top faces of said elements making an angle of twelve degrees with the horizontal and relatively arranged in parallel planes to simultaneously engage from edge to edge thereof with the root surface of a Dardelet thread laid thereon, the two plane side faces of each element making angles of $20\frac{1}{2}$ and $8\frac{1}{2}$ degrees respectively with the vertical and the side face making the smallest angle extending downward from the lowest edge of the top face of the element, and a dial indicator having a movable actuating element provided with a thread groove entering end portion and mounted on the support for movement of said end portion vertically and for movement of said member horizontally below said end portion.

7. In a minor diameter gauge for external Dardelet screw threads, the combination of a support, a dial indicator mounted on said support having a spring projected reciprocable actuating plunger provided with a thread groove entering outer conoidal end portion having a thread root surface engaging end toward which said end portion tapers at an angle of $8\frac{1}{2}$ degrees to the axial line of the plunger, a member having a thread groove entering portion and mounted on the support for calipering of a thread root between its thread groove entering portion and that of said actuating plunger, the thread groove entering portion of said member having a thread root surface engaging end face making widthwise thereof an angle of 12 degrees with a perpendicular to the axial line of the plunger and having two side faces converging toward the opposite edges of said end face at angles respectively of $20\frac{1}{2}$ and $8\frac{1}{2}$ degrees to the axial line of the plunger.

8. A minor diameter gauge for external Dardelet screw threads as claimed in claim 7, wherein said member is slidably mounted on said support for movement in a plane perpendicular to the axial line of the plunger.

9. A minor diameter gauge for external Dardelet screw threads comprising a support, a dial indicator mounted on the support having a spring projected reciprocable actuating plunger formed with a thread groove entering outer end portion tapering toward its end at an angle of $8\frac{1}{2}$ degrees to the axial line of the plunger, and a member mounted on the support to slide in a plane perpendicular to the axial line of the plunger into and out of a position opposite the outer end of the plunger, said member having a pair of parallel thread groove entering ribs at the face thereof which is opposed to the plunger, said ribs each having side faces converging towards the top of the rib at angles to the axial line of the plunger of $20\frac{1}{2}$ and $8\frac{1}{2}$ degrees and a thread root engaging top face making an angle of 12 degrees with a perpendicular to the axial line of the plunger, the rib top faces lying in parallel planes spaced for seating of both said faces from edge to edge on the root surface of a Dardelet thread engaged with said ribs, and the side faces of the two ribs making said $20\frac{1}{2}$ degree angle both facing in the same direction and each making an angle of $98\frac{1}{2}$ degrees with the top face of the rib.

In testimony whereof I hereunto affix my signature.

WILLIAM E. HOKE.